US009422426B2

(12) United States Patent
Kwon et al.

(10) Patent No.: US 9,422,426 B2
(45) Date of Patent: Aug. 23, 2016

(54) TRANSPARENT THERMOPLASTIC RESIN COMPOSITION AND MOLDED ARTICLE USING THE SAME

(71) Applicant: Cheil Industries Inc., Gumi-si (KR)

(72) Inventors: Kee-Hae Kwon, Uiwang-si (KR); In-Chol Kim, Uiwang-si (KR); Jung-Eun Park, Uiwang-si (KR); Jeong-Min Lee, Uiwang-si (KR); Jin-Young Huh, Uiwang-si (KR); Chang-Min Hong, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 14/044,954

(22) Filed: Oct. 3, 2013

(65) Prior Publication Data

US 2014/0187704 A1 Jul. 3, 2014

(30) Foreign Application Priority Data

Dec. 28, 2012 (KR) ........................ 10-2012-0157569

(51) Int. Cl.

| | |
|---|---|
| ***C08L 33/12*** | (2006.01) |
| ***C08L 51/04*** | (2006.01) |
| ***C08F 265/06*** | (2006.01) |
| ***C08F 279/02*** | (2006.01) |

(52) U.S. Cl.

CPC ............... *C08L 33/12* (2013.01); *C08F 265/06* (2013.01); *C08F 279/02* (2013.01); *C08L 51/04* (2013.01); *C08L 2207/53* (2013.01)

(58) Field of Classification Search

CPC ...... C08L 33/12; C08L 51/04; C08L 2207/53

USPC ........................................................ 523/201

See application file for complete search history.

(56) References Cited

U.S. PATENT DOCUMENTS

| | | | | |
|---|---|---|---|---|
| 5,312,575 | A | 5/1994 | Wills | |
| 6,310,137 | B1 | 10/2001 | Uno et al. | |
| 2005/0013962 | A1 * | 1/2005 | Ederle | C08L 33/12 428/64.2 |
| 2010/0168332 | A1 | 7/2010 | Chung et al. | |
| 2011/0171441 | A1 | 7/2011 | Choi et al. | |

FOREIGN PATENT DOCUMENTS

| | | | |
|---|---|---|---|
| EP | 0527605 | A1 | 2/1993 |
| JP | 06145263 | A * | 5/1994 |
| JP | 11-035767 | A | 2/1999 |
| JP | 2002-309056 | A | 10/2002 |
| KR | 10-2001-0013544 | A | 2/2001 |
| KR | 10-2004-0014252 | A | 2/2004 |
| KR | 10-2009-0067104 | A | 6/2009 |
| KR | 10-2010-0078850 | A | 7/2010 |

OTHER PUBLICATIONS

Machine translation of KR 10-2011-0082121, Jul. 18, 2011.*
Machine translation of JP 06-145263 A, May 24, 1994.*

* cited by examiner

*Primary Examiner* — Vickey Nerangis
(74) *Attorney, Agent, or Firm* — Additon, Higgins & Pendleton, P.A.

(57) ABSTRACT

Disclosed are a transparent thermoplastic resin composition including (A) about 5 to about 40 wt % of an impact-reinforcing agent having a core-shell structure where an acrylic-based compound is grafted on a rubber core including a copolymer of an acrylic-based monomer and a diene-based monomer, to form a shell, and (B) about 60 to about 95 wt % of an acrylic-based resin, and a molded article using the same.

17 Claims, No Drawings

TRANSPARENT THERMOPLASTIC RESIN COMPOSITION AND MOLDED ARTICLE USING THE SAME

CROSS-REFERENCE TO RELATED APPLICATION

This application claims priority to and the benefit of Korean Patent Application No. 10-2012-0157569 filed in the Korean Intellectual Property Office on Dec. 28, 2012, the entire disclosure of which is incorporated herein by reference.

FIELD OF THE INVENTION

A transparent thermoplastic resin composition and a molded article using the same are disclosed.

BACKGROUND OF THE INVENTION

A thermoplastic resin can have improved properties such as lower specific gravity than glass or metal and improved formability, impact resistance, and the like. Recently, thermoplastic resins have been used to manufacture plastic products, as electric/electronic products are becoming less expensive and also larger and lighter. The plastic products have rapidly replaced conventional glass or metal products and have been widely used in a variety of products, from electric/electronic products to auto parts.

There is also an increasing demand for light weight unpainted materials for auto materials to save energy and provide environmental friendliness. When an unpainted material is used as an auto exterior material, the unpainted material does not need to be painted using conventional painting processes and thus, can be environmentally-friendly and less expensive. Such unpainted materials, however, require high coloring properties and also weather resistance against outdoor temperature and moisture and scratch resistance against an external impact or chip.

Conventionally, auto exterior materials include an acrylate-styrene-acrylonitrile copolymer (ASA) resin, which can have improved weather resistance as compared to a conventional acrylonitrile-butadiene-styrene copolymer (ABS) resin. The ASA resin can maintain the properties of the ABS resin and have improved weather resistance by using an acrylic-based impact-reinforcing agent (g-ASA) with no double bond (that has poor weather resistance). The ASA resin, however, can exhibit deteriorated coloring properties and scratch resistance, which are caused by the low refractive index of the acrylic-based impact-reinforcing agent. The ASA resins can be difficult to use as a high gloss and unpainted material.

In contrast, an acrylic-based resin represented by a polymethylmethacrylate (PMMA) resin can have improved transparency, weather resistance, mechanical strength, surface gloss, adherence, and the like and particularly, very improved scratch resistance. PMMA resins, however, can have very weak impact resistance and thus may not be appropriately used as an auto exterior material.

The impact resistance of the acrylic-based resin having improved coloring properties, weather resistance, and scratch resistance may be increased by using a transparent acrylic-based impact-reinforcing agent having a similar refractive index to that of the acrylic-based resin. See, for example, Korea Patent Nos. 1999-7011551 and 2003-0053711.

However, when such a transparent acrylic-based impact-reinforcing agent is used to increase impact resistance, the impact improvement effect can be lowered due to the transparent acrylic-based impact-reinforcing agent having lower impact efficiency than a butadiene-based impact-reinforcing agent. For example, when a transparent acrylic-based impact-reinforcing agent prepared using an acrylic-based monomer and a styrene monomer in a core and an acrylic-based monomer in a shell to match the refractive index of the acrylic resin is used with the acrylic-based resin, the impact reinforcement effect can be relatively lower than the acrylic-based impact-reinforcing agent (g-ASA) for ASA.

In addition, the transparent acrylic-based impact-reinforcing agent can deteriorate heat resistance or mechanical properties and scratch resistance when its amount is increased and thus, has a limit in improving impact strength.

According to another method, the transparent acrylic-based impact-reinforcing agent may be used with a butadiene-based impact-reinforcing agent in a small amount to supplement deterioration of impact strength. This, however, can deteriorate weather resistance.

SUMMARY OF THE INVENTION

A transparent thermoplastic resin composition and a molded article using the same that can have high impact strength as well as improved coloring properties, scratch resistance, and weather resistance are provided.

In one embodiment of the present invention, a transparent thermoplastic resin composition includes (A) about 5 to about 40 wt % of an impact-reinforcing agent having a core-shell structure wherein an acrylic-based compound is grafted on a rubber core including a copolymer of an acrylic-based monomer and a diene-based monomer, to form a shell, and (B) about 60 to about 95 wt % of an acrylic-based resin.

In the rubber core, the acrylic-based monomer and diene-based monomer may be present in a weight ratio of about 99:1 to about 50:50.

The impact-reinforcing agent (A) may include the rubber core in an amount of about 30 to about 80 wt %, and the shell in an amount of about 20 to about 70 wt %, based on 100 wt % of the impact-reinforcing agent (A).

The impact-reinforcing agent (A) may have a particle diameter of about 50 to about 500 nm.

The impact-reinforcing agent (A) may have a glass transition temperature of about −70 to about −55°.

The impact-reinforcing agent (A) may have an average refractive index of about 1.474 to about 1.496.

The acrylic-based resin (B) may have a refractive index of about 1.480 to about 1.495.

A refractive index difference between the impact-reinforcing agent (A) and the acrylic-based resin (B) may range from about 0.001 to about 0.02.

The acrylic-based resin (B) may have a weight average molecular weight of about 50,000 to about 200,000 g/mol.

The transparent thermoplastic resin composition may further include an impact-reinforcing agent having a core-shell structure where an acrylic-based compound is grafted on a rubber core including a copolymer of a C4 to C30 acrylic-based monomer and an aromatic vinyl-based monomer, to form a shell.

In another embodiment of the present invention, a molded article using the transparent thermoplastic resin composition is provided.

The molded article may have a haze of about 0.5% to about 10%, and transmittance of about 85% to about 95% which are measured at a thickness of about 1.5 to about 2.5 mm.

The molded article may include a black colorant, and the molded article may have an L value of a CIE color coordinate of less than about 28 with reference to black.

The molded article may have pencil hardness (JIS K 5401) of greater than or equal to HB.

The molded article may have ΔE value indicating weather resistance of less than or equal to 3 which is measured after about 3000 hours under a SAE J 1960 condition.

The molded article may have a ⅛" Izod impact strength (ASTM D256) of about 3 to about 12 kgf·cm/cm.

A transparent thermoplastic resin composition according to one embodiment of the present invention and a molded article using the same can have high impact strength as well as improved coloring properties, scratch resistance, and weather resistance.

DETAILED DESCRIPTION

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a definition is not otherwise provided, the term "substituted" refers to one substituted with a C1 to C30 alkyl group; a C1 to C10 alkylsilyl group; a C3 to C30 cycloalkyl group; a C6 to C30 aryl group; a C2 to C30 heteroaryl group; a C1 to C10 alkoxy group; a fluoro group, a C1 to C10 trifluoroalkyl group such as a trifluoromethyl group and the like; a cyano group, or a combination thereof, instead of at least one hydrogen of a compound.

As used herein, when a definition is not otherwise provided, the term "hetero" may refer to one including 1 to 3 heteroatoms including N, O, S, P, or a combination thereof in place of one or more carbon atoms in a compound or a substituent.

As used herein, when a definition is not otherwise provided, the term "alkyl group" may refer to a "saturated alkyl group" without an alkene group or an alkyne group; or an "unsaturated alkyl group" including at least one of an alkene group and an alkyne group. The term "alkene group" may refer to a substituent in which at least two carbon atoms are bound with at least one carbon-carbon double bond, and the term "alkynyl group" refers to a substituent in which at least two carbon atoms are bound with at least one carbon-carbon triple bond. The alkyl group may be a branched, linear, or cyclic alkyl group.

The alkyl group may be a C1 to C20 alkyl group, for example a C1 to C6 lower alkyl group, a C7 to C10 middle alkyl group, or a C11 to C20 higher alkyl group.

The term "aromatic group" may refer a compound including a cyclic structure where all elements have p-orbitals which form conjugation. An aryl group and a heteroaryl group may be exemplified.

The term "aryl group" may refer to a monocyclic or fused ring-containing polycyclic (i.e., rings sharing adjacent pairs of carbon atoms) groups.

The "heteroaryl group" may refer to one including 1 to 3 heteroatoms including N, O, S, P or a combination thereof in place of one or more carbon atoms of the aryl group. When the heteroaryl group is a fused ring, each ring may include 1 to 3 heteroatoms.

As used herein, when a specific definition is not otherwise provided, (meth)acrylate refers to acrylate or methacrylate. The (meth)acrylic acid alkyl ester refers to acrylic acid alkyl ester or methacrylic acid alkyl ester, and (meth)acrylic acid ester refers to acrylic acid ester or methacrylic acid ester.

As used herein, when a definition is not otherwise provided, the "copolymerization" may refer to a block copolymerization, random copolymerization, graft copolymerization, or alternating copolymerization, and the term "copolymer" may refer to a block copolymer, random copolymer, graft copolymer, or alternating copolymer.

In one embodiment of the present invention, a transparent thermoplastic resin composition includes (A) about 5 to about 40 wt % of an impact-reinforcing agent having a core-shell structure where an acrylic-based compound is grafted on a rubber core including a copolymer of an acrylic-based monomer and a diene-based monomer, to form a shell, and (B) about 60 to about 95 wt % of an acrylic-based resin.

Hereinafter, each component of the thermoplastic resin composition is described in detail.

(A) Impact-Reinforcing Agent

The impact-reinforcing agent is a compound having a core-shell structure where an acrylic-based compound is grafted on a rubber core including a copolymer of an acrylic-based monomer and a diene-based monomer. The shell may be a monolayer shell or a multi-layer shell including two or more layers.

The transparent thermoplastic resin composition including the impact-reinforcing agent may exhibit good impact strength as well as improved coloring properties, weather resistance, and/or scratch resistance.

In the rubber core, the acrylic-based monomer may be a C4 to C30 acrylic-based monomer. Examples of the acrylic-based monomer may include without limitation methyl (meth)acrylate, ethyl(meth)acrylate, n-propyl(meth)acrylate, n-butyl(meth)acrylate, hexyl(meth)acrylate, 2-ethylhexyl (meth)acrylate, lauryl(meth)acrylate, stearyl(meth)acrylate, and the like, and combinations thereof.

The rubber core may also include a curing agent. Examples of the curing agent may include without limitation ethylene glycol di(meth)acrylate, propylene glycol di(meth)acrylate, 1,3-butylene glycol di(meth)acrylate, 1,4-butylene glycol di(meth)acrylate, allyl(meth)acrylate, triallylcyanurate, and the like and combinations thereof.

In the rubber core, the diene-based monomer may be a C4 to C6 diene. Examples of the diene may include without limitation 1,3-butadiene, isoprene, and the like, and combinations thereof. In exemplary embodiments, the diene may include 1,3-butadiene.

In the shell, examples of the acrylic-based compound may include without limitation (meth)acrylates, alkyl(meth)acrylates, and the like, and combinations thereof. Specific examples of the acrylic-based compound may include without limitation methyl(meth)acrylate, ethyl(meth)acrylate, n-propyl(meth)acrylate, n-butyl(meth)acrylate, hexyl(meth) acrylate, 2-ethylhexyl(meth)acrylate, lauryl(meth)acrylate, stearyl(meth)acrylate, and the like, and combinations thereof.

The impact-reinforcing agent may include the rubber core in an amount of about 30 to about 80 wt %, for example about 50 to about 75 wt %, based on the total weight (100 wt %) of the impact-reinforcing agent. In some embodiments, the impact-reinforcing agent may include the rubber core in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the rubber core can be in a range from about any of the foregoing amounts to about any other of the foregoing amounts.

The impact-reinforcing agent may include the shell in an amount of about 20 to about 70 wt %, for example about 25 to about 50 wt %%, based on the total weight (100 wt %) of the impact-reinforcing agent. In some embodiments, the impact-reinforcing agent may include the shell in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, the amount of the shell can be in a range from about any of the foregoing amounts to about any other of the foregoing amounts.

When the impact-reinforcing agent includes the rubber core and the shell in an amount within the above ranges, the transparent thermoplastic resin composition including the impact-reinforcing agent may exhibit good impact strength as well as improved coloring properties, weather resistance, and/or scratch resistance.

In the rubber core of the impact-reinforcing agent (A), the acrylic-based monomer and diene-based monomer can be present in a weight ratio of about 99:1 to about 50:50.

In some embodiments, the rubber core may include the acrylic-based monomer in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of the acrylic-based monomer can be in a range from about any of the foregoing amounts to about any other of the foregoing amounts.

In some embodiments, the rubber core may include the diene-based monomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the diene-based monomer can be in a range from about any of the foregoing amounts to about any other of the foregoing amounts.

The impact-reinforcing agent may have an average particle diameter of about 50 to about 500 nm, for example about 100 to about 300 nm. When the avergae particle diameter of the impact-reinforcing agent in within the above range, the transparent thermoplastic resin composition including the impact-reinforcing agent may exhibit good impact strength as well as improved coloring properties, weather resistance, and/or scratch resistance.

The impact-reinforcing agent may have a glass transition temperature (Tg) of about −70 to about −55° C., for example about −70 to about −60°. Within the above range, the transparent thermoplastic resin composition including the impact-reinforcing agent may exhibit good impact strength as well as improved coloring properties, weather resistance, and/or scratch resistance.

The impact-reinforcing agent may have a refractive index of about 1.474 to about 1.496. The refractive index is measured using spectroscopic ellipsometers, a refractive index measuring device, J. A. Woollam.

The transparent thermoplastic resin composition may include the impact-reinforcing agent in an amount of about 5 to about 40 wt %, for example about 15 to about 30 wt %, based on 100 wt % of the transparent thermoplastic resin composition. In some embodiments, the transparent thermoplastic resin composition may include the impact-reinforcing agent in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the amount of the impact-reinforcing agent can be in a range from about any of the foregoing amounts to about any other of the foregoing amounts.

When the transparent thermoplastic resin composition includes the impact-reinforcing agent in an amount within the above range, the transparent thermoplastic resin composition may exhibit good impact strength as well as improved coloring properties, weather resistance, and/or scratch resistance.

(B) Acrylic-Based Resin

The transparent thermoplastic resin composition includes an acrylic-based resin. The acrylic-based resin may be any conventional or generally-used acrylic-based resin without limitation, in this art.

Examples of the acrylic-based resin may include without limitation (meth)acrylates, alkyl(meth)acrylates, and the like and combinations thereof. The term (meth)acrylate can be methacrylate or acrylate, and the alkyl(meth)acrylate can be alkylmethacrylate or alkylacrylate. The alkyl may be C1 to C10 alkyl.

Examples of the alkyl(meth)acrylate may include without limitation methyl(meth)acrylate, ethyl(meth)acrylate, propyl (meth)acrylate, butyl(meth)acrylate, glycidyl(meth)acrylate, hydroxyethyl(meth)acrylate, and the like, and combinations thereof.

The acrylic-based resin may be obtained by polymerizing raw monomers including (meth)acrylate and/or alkyl(meth) acrylate using any well-known polymerization method such as a suspension polymerization method, a massive polymerization method, emulsion polymerization method and the like.

The acrylic-based resin may be, for example, a copolymer of alkylmethacrylate and alkylacrylate. The acrylic-based resin may include about 80 to about 99 wt % of the alkylmethacrylate and about 1 to about 20 wt % of the alkylacrylate.

In some embodiments, the acrylic-based resin may include the alkylmethacrylate in an amount of about 80, 81, 82, 83, 84, 85, 86, 87, 88, 89, 90, 91, 92, 93, 94, 95, 96, 97, 98, or 99 wt %. Further, according to some embodiments of the present invention, the amount of the alkylmethacrylate can be in a range from about any of the foregoing amounts to about any other of the foregoing amounts.

In some embodiments, the acrylic-based resin may include the alkylacrylate in an amount of about 1, 2, 3, 4, 5, 6, 7, 8, 9, 10, 11, 12, 13, 14, 15, 16, 17, 18, 19, or 20 wt %. Further, according to some embodiments of the present invention, the amount of the alkylacrylate can be in a range from about any of the foregoing amounts to about any other of the foregoing amounts.

The acrylic-based resin may have a refractive index of about 1.480 to about 1.495, for example about 1.485 to about 1.490. A refractive index difference between the impact-reinforcing agent (A) and the acrylic-based resin (B) may range from about 0.001 to about 0.02, for example about 0.006 to about 0.01. Within the above range, the transparent thermoplastic resin composition may have high transparency and improved coloring properties. The refractive index is measured using spectroscopic ellipsometers (a refractive index measuring device, J. A. Woollam).

The acrylic-based resin may have a weight average molecular weight of about 50,000 to about 200,000 g/mol, for example about 70,000 to about 150,000 g/mol. The weight average molecular weight is a molecular weight, reduced to polystyrene, measured using a gel permeation chromatography. Within the above range, the transparent thermoplastic resin composition may have improved coloring properties, scratch resistance, and/or weather resistance.

The transparent thermoplastic resin composition may include the acrylic-based resin in an amount of about 60 to about 95 wt %, based on 100 wt % of the transparent thermoplastic resin composition. In some embodiments, the transparent thermoplastic resin composition may include the acrylic-based resin in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the acrylic-based resin can be in a range from about any of the foregoing amounts to about any other of the foregoing amounts.

(C) Other Impact-Reinforcing Additives

The transparent thermoplastic resin composition may further include one or more other impact-reinforcing additives as well as the above-described impact-reinforcing agent.

The other impact-reinforcing additive may have a structure where an unsaturated compound is grafted on a rubber core to form a shell.

The rubber core may be a rubbery polymer obtained by polymerizing a monomer including a diene-based monomer; or a diene-based monomer and an acrylic-based monomer, a silicon-based monomer, a styrene-based monomer, or a combination thereof.

The other impact-reinforcing additive may include the rubber core in an amount of about 20 to about 80 wt % based on the total weight (100 wt %) of the other impact-reinforcing additive. In some embodiments, the other impact-reinforcing agent may include the rubber core in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the rubber core can be in a range from about any of the foregoing amounts to about any other of the foregoing amounts.

Examples of the unsaturated compound grafted on the rubber core may include without limitation acrylic-based monomers, aromatic vinyl monomers, unsaturated nitrile monomers, reactive monomers, polymers of one or more kinds of the foregoing monomers, and the like, and combinations thereof.

In one embodiment, the transparent thermoplastic resin composition may further include an impact-reinforcing agent having a core-shell structure where an acrylic-based compound is grafted on a rubber core including a copolymer of a C4 to C30 acrylic-based monomer and an aromatic vinyl-based monomer, to form a shell.

In the rubber core, examples of the C4 to C30 acrylic-based monomer may include without limitation n-butyl(meth)acrylate, hexyl(meth)acrylate, 2-ethylhexyl(meth)acrylate, and the like, and combinations thereof.

In the rubber core, examples of the aromatic vinyl-based monomer may include without limitation styrene, C1 to C10 alkyl substituted styrene, halogen substituted styrene, and the like, and combinations thereof. Examples of the alkyl substituted styrene may include without limitation o-ethyl styrene, m-ethyl styrene, p-ethyl styrene, α-methyl styrene, and the like, and combinations thereof.

In the shell, examples of the acrylic-based compound may include without limitation (meth)acrylates, alkyl(meth)acrylates, and the like, and combinations thereof. Examples of the acrylic-based compound may include without limitation methyl(meth)acrylate, ethyl(meth)acrylate, n-propyl(meth)acrylate, n-butyl(meth)acrylate, hexyl(meth)acrylate, 2-ethylhexyl(meth)acrylate, and the like, and combinations thereof.

When the transparent thermoplastic resin composition further includes the other impact-reinforcing additive, the transparent thermoplastic resin composition may include about 2.5 to about 35 wt % of the impact-reinforcing agent (A), about 60 to about 95 wt % of the acrylic-based resin (B), and about 2.5 to about 35 wt % of the other impact-reinforcing additive (C).

In some embodiments, the transparent thermoplastic resin composition may include the impact-reinforcing agent (A) in an amount of about 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, or 35 wt %. Further, according to some embodiments of the present invention, the amount of the impact-reinforcing agent (A) can be in a range from about any of the foregoing amounts to about any other of the foregoing amounts.

In some embodiments, the transparent thermoplastic resin composition may include the acrylic-based resin (B) in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the acrylic-based resin (B) can be in a range from about any of the foregoing amounts to about any other of the foregoing amounts.

In some embodiments, the transparent thermoplastic resin composition may include the other impact-reinforcing additive (C) in an amount of about about 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, or 35 wt %. Further, according to some embodiments of the present invention, the amount of the other impact-reinforcing additive (C) can be in a range from about any of the foregoing amounts to about any other of the foregoing amounts.

In this case, the transparent thermoplastic resin composition may ensure improved impact resistance as well as improved coloring properties, scratch resistance and/or weather resistance.

(D) Other Additives

The transparent thermoplastic resin composition may further comprise one or more kinds of other additives in order to adjust balance between properties, or as needed for the end uses. Examples of the other additives may include without limitation flame retardants, surfactants, nucleating agents, coupling agents, filler, plasticizers, impact-reinforcing agents, lubricants, antibacterial agents, release agents, antioxidants, inorganic material additives, colorants such as dyes and/or pigments, lubricants, anti-static agents, flame-proofing agents, heat stabilizers, ultraviolet (UV) absorbers, ultraviolet (UV) blocking agents, nucleating agents, adhesives, and the like. These may be may be used singularly or in a combination of two or more.

Particularly, the transparent thermoplastic resin composition may further include a colorant depending on its end uses or purposes.

The other additives may be may be included in a predetermined amount as long as it does not deteriorate the properties of the resin composition. The additives may be included in an amount of less than or equal to about 40 parts by weight, for example about 0.1 to about 30 parts by weight, based on about 100 parts by weight of the resin composition.

The above-described transparent thermoplastic resin composition may be prepared by any conventional or well-known method of preparing a resin composition. For example, each component according to one embodiment of the present invention can be simultaneously mixed optionally with one or more other additives. The mixture can be melt-extruded and prepared into pellets.

According to another embodiment of the present invention, a molded article manufactured using the transparent thermoplastic resin composition is provided.

The molded article may be manufactured by various processes such as injection-molding, blow molding, extrusion molding, thermal molding, and the like, using the thermoplastic resin composition.

The molded article may exhibit improved weather resistance as well as improved mechanical properties such as impact property and the like and heat resistance and thus, may be used in the manufacture of various outdoor electric/electronic parts, building materials, sport goods, auto parts, and the like.

The molded article can have improved transparency. The transparency of the molded article may be evaluated by haze and transmittance (TT). When the molded article has lower haze and higher transmittance, the molded article has improved transparency.

The haze indicates a degree of opaqueness or cloudiness, and may be calculated according to the following Calculation Equation 1.

Haze (%)={diffused light/(diffused and transmitted light+parallel transmitted light)}×100 [Calculation Equation 1]

The transmittance indicates a degree to which a molded article transmits light and may be calculated according to the following Calculation Equation 2.

Transmittance (%)=(transmission energy/projection energy)×100 [Calculation Equation 2]

The molded article may have a haze of about 0.5% to about 10%, for example about 1% to about 5%, which is measured at a thickness of about 1.5 to about 2.5 mm. The molded article may have transmittance of about 85% to about 95%, for example about 87% to about 93%. This result shows that the molded article has high transparency.

The haze and transmittance are evaluated according to an evaluation method of ASTM D1003 by using a Hazemeter NDH 2000 equipment made by Nippon Denshoku Industries Co., Ltd.

The molded article also can have improved coloring properties. When the molded article includes a black colorant, the molded article may have L of less than 28 for example, less than 26 with a reference to a Lab color coordinate of Commission International de L' Eclairage (CIE).

The L indicates brightness in a CIE color coordinate. As the L is higher, the molded article has high brightness, bright color sense, and low coloring properties. When the black molded article has L of less than 28, the molded article has high coloring properties.

The L is measured by using a CCM measurement equipment with a reference to SCI.

The molded article can have improved scratch resistance. The molded article can have a pencil hardness (JIS K 5401) of greater than or equal to HB for example, greater than or equal to F.

The molded article can have improved weather resistance. In the present invention, the weather resistance of the molded article is evaluated by using L, a, b, and ΔE used in a Lab color coordinate of Commission International de L' Eclairage (CIE). In the CIE Lab color coordinate, brightness is marked as L, and chromaticity indicating color and chroma is marked as a and b. As the a is larger, a color is close to red, and as the a is smaller, a color is close to green. As the b is larger, a color is close to yellow, and the b is smaller, a color close to blue is expressed.

In the CIE Lab color coordinate, a color difference is indicated as delta E (ΔE). The ΔE is calculated according to the following Calculation Equation 1:

$$\Delta E=\sqrt{(\Delta L)^2+(\Delta a)^2+(\Delta b)^2} \quad \text{[Calculation Equation 1]}$$

The molded article may have ΔE value indicating weather resistance of less than or equal to 3 which is measured after about 3000 hours under a SAE J 1960 condition. This result shows that the molded article has minimal or no color change but still ΔE in a low range despite a long elapsed time. In addition, this shows that the molded article can exhibit improved weather resistance.

The molded article can have improved impact strength. The molded article may have a ⅛" Izod impact strength (ASTM D256) of about 3 to about 12 kgf·cm/cm, for example about 5 to about 12 kgf·cm/cm. This shows that the molded article can exhibit high impact strength.

Hereinafter, the present invention is illustrated in more detail with reference to examples and comparative examples. However, the following examples and comparative examples are provided for the purpose of descriptions and the present invention is not limited thereto.

Examples 1 to 5 and Comparative Examples 1 to 7

A pellet-shaped resin is prepared by mixing each of the components listed in the following Table 1 in an amount shown in the following Table 1 and then, extruding and processing the mixture. The extrusion is performed by using a twin-screw extruder having L/D=29 and a diameter of 45 mm and setting a Barrel temperature at 220° C.

TABLE 1

(unit: wt %)

| | | Examples | | | | | Comparative Example | | | | | | |
|---|---|---|---|---|---|---|---|---|---|---|---|---|---|
| | | 1 | 2 | 3 | 4 | 5 | 1 | 2 | 3 | 4 | 5 | 6 | 7 |
| (A) Impact-reinforcing agent | (A-1) | 17 | 20 | 10 | 23 | | | | | | | | |
| | (A-2) | | | | | 20 | | | | | | | |
| (B) Acrylic-based resin | | 83 | 80 | 80 | 77 | 80 | 83 | 80 | 77 | 80 | 80 | 80 | 80 |
| (C) other impact--reinforcing additive | (C-1) | | | 10 | | | 17 | 20 | 23 | 15 | | | |
| | (C-2) | | | | | | | | | | 20 | 15 | 15 |
| | (C-3) | | | | | | | | | 5 | | 5 | |
| | (C-4) | | | | | | | | | | | | 5 |

Each component in Table 1 is described as follows.

(A) Impact-Reinforcing Agent (A-1) An impact-reinforcing agent (M-270, Kanaka) having a core-shell structure formed of 70 parts by weight of a rubber core prepared by copolymerizing butylacrylate and butadiene in a weight ratio of 65:35 and having a refractive index of 1.49 and a shell formed by graft-copolymerizing 30 parts by weight of methylmethacrylate and having an average particle diameter of about 300 nm is used.

(A-2) An impact-reinforcing agent having a core-shell structure formed of 70 parts by weight of a rubber core prepared by copolymerizing butylacrylate and butadiene in a weight ratio of 65:35 and a refractive index of 1.49 and a shell formed by copolymerizing 30 parts by weight of methylmethacrylate and having an average particle diameter of about 180 nm is used.

(B) Acrylic-Based Resin

An acrylic-based resin (Cheil Industries Inc.) prepared by polymerizing 97.5 parts by weight of methylmethacrylate with 2.5 parts by weight of methylacrylate in a conventional suspension polymerization method and having a refractive index of 1.49 and a weight average molecular weight of 100,000 g/mol is used.

(C) Other Impact-Reinforcing Additive (C-1) A transparent acrylic-based impact-reinforcing agent (M-210, Kaneka) having a core-shell shape including 70 parts by weight of a rubber core formed by copolymerized by butylacrylate and styrene and having a refractive index of 1.49 and a shell formed by graft-copolymerizing 30 parts by weight of methylmethacrylate and having an average rubber particle diameter of about 180 nm is used.

(C-2) An acrylic-based impact-reinforcing agent having a core-shell shape formed by graft-copolymerizing 50 parts by weight of a monomer mixture including 25 wt % of acrylonitrile and 75 wt % of styrene on 50 parts by weight of a butylacrylate rubber is used, and the rubber particle has an average diameter of about 180 nm.

(C-3) A butadiene-based impact-reinforcing agent having a core-shell shape formed by graft-copolymerizing 45 parts by weight of a monomer mixture including 75 wt % of methylmethacrylate, 5 wt % of acrylonitrile, and 20 wt % of styrene on 55 parts by weight of a butadiene rubber is used, and the obtained rubber particle has an average diameter of about 250 nm.

(C-4) A butadiene-based impact-reinforcing agent having a core-shell shape formed by graft-copolymerizing 45 parts by weight of a monomer mixture including 25 wt % of acrylonitrile and 75 wt % of styrene on 55 parts by weight of a butadiene rubber, and the obtained rubber particle has an average diameter of about 250 nm.

Evaluation Example 1

Transparency (Haze and Transmittance)

Pellet-shaped resins are prepared by mixing each component in Table 1 in the amounts set forth therein to prepare resin compositions and then, extruding and processing the resin compositions. The extrusion is performed by using a twin-screw extruder having L/D=29 and a diameter of 45 mm and setting a Barrel temperature at 220° C.

The pellets are dried at 80° C. for 2 hours and extruded with a 6 oz injection molding machine set at a cylinder temperature of 230° C. and a molding temperature 60° C., manufacturing 9 cm×5 cm×0.2 cm-sized specimens. Haze and transmittance of the specimens are measured, and the results are provided in the following Table 2.

The haze and transmittance (TT) of the 2.0 mm-thick specimens are used to evaluate transparency, which is measured using a Hazemeter NDH 2000 equipment made by Nippon Denshoku Industries Co., Ltd. according to evaluation criteria of ASTM D1003.

The lower haze and the higher transmittance the specimens have, the more improved transparency they have.

TABLE 2

| | Examples | | | | | Comparative Examples | | | | | | |
|---|---|---|---|---|---|---|---|---|---|---|---|---|
| | 1 | 2 | 3 | 4 | 5 | 1 | 2 | 3 | 4 | 5 | 6 | 7 |
| Haze (%) | 2.5 | 2.7 | 2.2 | 3.1 | 2.5 | 2.1 | 2.4 | 2.5 | 11.8 | 61.3 | 60.9 | 72.1 |
| Transmittance (%) | 91.5 | 91.2 | 91.6 | 90.9 | 91.4 | 91.7 | 91.5 | 91.1 | 73.0 | 45.1 | 47.3 | 41.9 |

Referring to Table 2, the specimens according to Examples 1 to 5 exhibit similar haze or transmittance characteristics for transparency evaluation compared to those of the specimens only using an acrylic-based impact-reinforcing agent according to Comparative Example 1 to 3 and improved haze or transmittance characteristics compared with the specimens using a butadiene-based impact-reinforcing agent with the acrylic-based impact-reinforcing agent according to Comparative Examples 4 to 7.

Evaluation Examples 2 to 6

Each component provided in Table 1 is mixed in the amounts set forth therein to prepare resin compositions, adding 0.3 parts by weight of a colorant, carbon black (HI-BLACK 50L), based on 100 parts by weight of the resin composition thereto, and extruding and processing the mixtures, preparing pellet-shaped resins. The extrusion is performed by using a twin-screw extruder having a L/D=29 and a diameter of 45 mm and setting a Barrel temperature at 220° C.

The pellets are dried at 80° C. for 2 hours and extruded using a 6 oz injection molding machine set at 230° C. of a cylinder temperature and 60° C. of a molding temperature, obtaining 9 cm×5 cm×0.2 cm-sized specimens. Properties of the specimens are measured using the following method, and the results are provided in the following Table 3.

Evaluation Example 2

Coloring Properties

A CCM measurement equipment is used to measure L values of the specimens with a reference to SCI.

Evaluation Example 3

Color Sense

Black color tones of the specimens sensed with naked eyes are evaluated with a reference to the following criteria.

⊚: very excellent, ○: excellent, Δ: average, X: unsatisfactory, XX: very unsatisfactory Evaluation Example 4

Scratch Resistance

Scratch resistance of the specimens is evaluated by measuring pencil hardness according to an evaluation method of JIS K 5401.

Evaluation Example 5

Weather Resistance

Color changes (ΔE) of the specimens are measured according to an evaluation method of SAE J 1960.

Evaluation Example 6

Impact Strength

Impact strength is measured according to a method of ASTM D256 by making a notch in ⅛" Izod specimens.

TABLE 3

| | Examples | | | | | Comparative Examples | | | | | | |
|---|---|---|---|---|---|---|---|---|---|---|---|---|
| | 1 | 2 | 3 | 4 | 5 | 1 | 2 | 3 | 4 | 5 | 6 | 7 |
| Coloring properties (L value) | 24.3 | 24.5 | 24.7 | 24.6 | 24.4 | 25 | 25.2 | 25.3 | 25.9 | 26.5 | 26.4 | 27.1 |
| Color Sense | ◎ | ◎ | ◎ | ◎ | ◎ | ◎ | ◎ | ◎ | Δ | X | X | XX |
| Scratch resistance (pencil hardness) | H | H | H | F | H | H | H | F | F | F | F | HB |
| Weather resistance (dE, 3000 hours) | 2.3 | 2.5 | 2.4 | 2.7 | 2.4 | 2.2 | 2.4 | 2.5 | 2.8 | 2.7 | 2.9 | 3.8 |
| Izod impact strength (kgf · cm/cm) | 5.6 | 7.5 | 5.5 | 8.9 | 6 | 3.1 | 4.5 | 5 | 6 | 7.1 | 8.2 | 9 |

Referring to Table 3, the specimens according to Examples 1 to 5 exhibit improved coloring properties, color sense, scratch resistance, and weather resistance and simultaneously, high Izod impact strength.

The specimens according to Examples 1 to 5 exhibit an L value of 24.3 to 24.7 in a CIE color coordinate, which is lower than those of the specimens according to Comparative Examples 1 to 7. This indicates improved coloring properties of black. In addition, the specimens according to Examples 1 to 5 all exhibit very improved color sense. The pencil hardness of the specimens according to Examples 1 to 5 also is evaluated as F or H, which shows that the specimens have improved scratch resistance. The specimens according to Examples 1 to 5 have a dE of 2.3 to 2.7 and particularly, improved weather resistance compared with the specimens according to Comparative Examples 4 to 7. The specimens according to Examples 1 to 5 exhibit Izod impact strength of 5.5 to 8.9 kgf·cm/cm and thus, have improved impact strength.

In contrast, the specimens using a transparent acrylic-based impact-reinforcing agent (C-1) according to Comparative Examples 1 to 3 have improved coloring properties but not remarkably improved Izod impact strength.

The specimen using a transparent acrylic-based impact-reinforcing agent (C-1) and a butadiene-based impact-reinforcing agent (C-3) according to Comparative Example 4 has improved impact strength but deteriorated coloring properties and color sense and thus, deteriorated scratch resistance and weather resistance compared with the specimens according to the Examples exemplifying the invention.

The specimen using an acrylic-based impact-reinforcing agent (C-2) according to Comparative Example 5 and the specimens using a mixture of acrylic-based impact-reinforcing agent (C-2) and a butadiene-based impact-reinforcing agent (C-4) according to Comparative Examples 6 to 7 have improved impact strength but not remarkably improved coloring properties and color sense and sharply deteriorated scratch resistance and weather resistance compared with the specimens according to the Examples exemplifying the invention.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A transparent thermoplastic resin composition comprising:

(A) about 5 to about 40 wt % of an impact-reinforcing agent having a core-shell structure wherein the core is a rubber core including a copolymer of an acrylic-based monomer and a diene-based monomer and the shell consists of an acrylic-based compound grafted on the core, wherein the acrylic-based compound is methyl(meth)acrylate, ethyl(meth)acrylate, n-propyl(meth)acrylate, n-butyl(meth)acrylate, hexyl(meth)acrylate, 2-ethylhexyl (meth)acrylate, lauryl(meth)acrylate, stearyl(meth) acrylate, or a combination thereof, and wherein in the rubber core, the acrylic-based monomer and the diene-based monomer are present in a weight ratio of about 99:1 to about 65:35, and (B) about 60 to about 95 wt % of an acrylic-based resin.

2. The transparent thermoplastic resin composition of claim 1, wherein the impact-reinforcing agent (A) includes about 30 to about 80 wt % of the rubber core, and about 20 to about 70 wt % of the shell, wherein the amounts are based on 100 wt % of the impact-reinforcing agent (A).

3. The transparent thermoplastic resin composition of claim 1, wherein the impact-reinforcing agent (A) has a particle diameter of about 50 to about 500 nm.

4. The transparent thermoplastic resin composition of claim 1, wherein the impact-reinforcing agent (A) has a glass transition temperature of about −70 to about −55° C.

5. The transparent thermoplastic resin composition of claim 1, wherein the impact-reinforcing agent (A) has an average refractive index of about 1.474 to about 1.496.

6. The transparent thermoplastic resin composition of claim 1, wherein the acrylic-based resin (B) has a refractive index of about 1.480 to about 1.495.

7. The transparent thermoplastic resin composition of claim 1, wherein a refractive index difference between the impact-reinforcing agent (A) and the acrylic-based resin (B) ranges from about 0.001 to about 0.02.

8. The transparent thermoplastic resin composition of claim 1, wherein the acrylic-based resin (B) has a weight average molecular weight of about 50,000 g/mol to about 200,000 g/mol.

9. The transparent thermoplastic resin composition of claim 1, wherein the transparent thermoplastic resin composition further comprises:

(C) an impact-reinforcing agent having a core-shell structure wherein an acrylic-based compound is grafted on a rubber core including a copolymer of a C4 to C30 acrylic-based monomer and an aromatic vinyl-based monomer, to form a shell.

10. The transparent thermoplastic resin composition of claim 1, wherein the (A) impact-reinforcing agent includes a rubber core consisting essentially of the acrylic-based monomer and the diene-based monomer.

11. The transparent thermoplastic resin composition of claim 1, wherein a molded article formed of the composition has a haze of about 0.5% to about 10% and a transmittance of about 85% to about 95% which are measured at a thickness of about 1.5 to about 2.5 mm.

12. A molded article using the transparent thermoplastic resin composition according to claim 1.

13. The molded article of claim 12, wherein the molded article has a haze of about 0.5% to about 10%, and a transmittance of about 85% to about 95% which are measured at a thickness of about 1.5 to about 2.5 mm.

14. The molded article of claim 12, wherein the molded article comprises a black colorant, and the molded article has an L value of a CIE color coordinate of less than about 28 with reference to black.

15. The molded article of claim 12, wherein the molded article has a pencil hardness (JIS K 5401) of greater than or equal to HB.

16. The molded article of claim 12, wherein the molded article has a ΔE value indicating weather resistance of less than or equal to 3 which is measured after about 3000 hours under a SAE J 1960 condition.

17. The molded article of claim 12, wherein the molded article has a ⅛" Izod impact strength (ASTM D256) of about 3 to about 12 kgf·cm/cm.

* * * * *